US007899014B2

(12) United States Patent
Li et al.

(10) Patent No.: US 7,899,014 B2
(45) Date of Patent: Mar. 1, 2011

(54) METHOD FOR DETERMINING USER CHANNEL IMPULSE RESPONSE IN TD-SCDMA SYSTEM

(75) Inventors: Feng Li, Shanghai (CN); Guiliang Yang, Shanghai (CN); Yuanxin Qiao, Shanghai (CN); Tiezhu Xu, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 614 days.

(21) Appl. No.: 11/915,049

(22) PCT Filed: Apr. 26, 2006

(86) PCT No.: PCT/CN2006/000794

§ 371 (c)(1),
(2), (4) Date: Mar. 27, 2008

(87) PCT Pub. No.: WO2006/125365

PCT Pub. Date: Nov. 30, 2006

(65) Prior Publication Data

US 2008/0259892 A1 Oct. 23, 2008

(30) Foreign Application Priority Data

May 24, 2005 (CN) .................... 2005 1 0072007

(51) Int. Cl.
*H04W 4/00* (2009.01)
*H04B 7/216* (2006.01)
*H04B 1/00* (2006.01)

(52) U.S. Cl. ................. 370/332; 370/335; 370/342; 375/140; 375/141; 375/149

(58) Field of Classification Search ............... 370/332, 370/335, 342; 375/140, 141, 149
See application file for complete search history.

(56) References Cited

U.S. PATENT DOCUMENTS 7,603,133 B2 * 10/2009 Bultan et al. ............... 455/502

(Continued)

FOREIGN PATENT DOCUMENTS

CN 1553586 A 8/2004

(Continued)

*Primary Examiner* — Huy D Vu
*Assistant Examiner* — Brandon Renner
(74) *Attorney, Agent, or Firm* — Stephen A. Bent; Foley & Lardner LLP

(57) ABSTRACT

The present invention discloses a method for determining user channel impulse response in the TD-SCDMA system, including: setting one or more than one synchronous ID code and establishing corresponding relations between channel estimation parameters of each user and the synchronous ID code and a sub-frame number of a sub-frame transmitting the synchronous ID code; transmitting, by each user, a corresponding synchronous ID code in a sub-frame identified by a sub-frame number corresponding to channel estimation parameters according to the relations established in step A, wherein timing advance of transmitting the synchronous ID code is the same with that of transmitting uplink service data of the user; at Node B, continuing to detect whether there is the synchronous ID code in received signals, if there is one or more than one synchronous ID code, determining the channel estimation parameters of the user transmitting the synchronous ID code according to the detected synchronous ID code, sub-frame number of the current sub-frame and the corresponding relations established in step A; and at Node B, computing the channel impulse response of the user according to the determined channel estimation parameters and arriving time of the detected synchronous ID code.

6 Claims, 2 Drawing Sheets

U.S. PATENT DOCUMENTS

| | | | |
|---|---|---|---|
| 2002/0154620 A1* | 10/2002 | Azenkot et al. | 370/347 |
| 2002/0154680 A1* | 10/2002 | Hao et al. | 375/141 |
| 2003/0043893 A1* | 3/2003 | Jard et al. | 375/152 |
| 2007/0274278 A1* | 11/2007 | Choi et al. | 370/342 |

FOREIGN PATENT DOCUMENTS

| | | |
|---|---|---|
| CN | 1588823 A | 3/2005 |
| WO | WO 02/09375 A1 | 1/2002 |

\* cited by examiner

METHOD FOR DETERMINING USER CHANNEL IMPULSE RESPONSE IN TD-SCDMA SYSTEM

FIELD OF THE INVENTION

The present invention relates to a multi-user joint-detection technology in a TD-SCDMA (Time Division Synchronous Code Division Multiple Access) system, especially to a method for determining user channel impulse response in the TD-SCDMA system.

BACKGROUND

In a CDMA (Code Division Multiple Access) system, signals of multiple users are overlapped in time domain and frequency domain. Since signals of different users are correlated, signals of different users at the receiver will create some interference and this kind of interference is called MAI (multiple access interference). Although the MAI of one user is small, with an increase in user number or signal power, the MAI will become one of the most important interferences for the CDMA system.

The TD-SCDMA system may eliminate the above multiple access interference by the multi-user joint-detection technology to increase the anti-interference ability of the system. The multi-user joint-detection refers to that when the receiver separates the received signals, it doesn't regard the MAI as the interference signal but fully makes use of the prior information included in the MAI such as the channel impulse response of each user, and separates signals of all the users from the received signals. Through the above multi-user joint-detection, the anti-interference ability of the TD-SCDMA system can be greatly improved and the capacity and coverage of the system is improved.

One premise to perform the multi-user joint-detection is to obtain the channel impulse response of each user to be detected. The TD-SCDMA system performs channel estimation according to a midamble transmitted in a normal slot by the user. FIG. 1 shows the sub-frame architecture of the TD-SCDMA system. As shown in FIG. 1, each sub-frame of the TD-SCDMA system includes 7 normal slots (TS0, TS1, ..., TS6) and 3 special slots (Downlink Pilot Time Slot DwPTS, main guard period for TDD operation GP and uplink Pilot Time Slot DwPTS). Each normal slot includes two data domains and one midamble domain, wherein the user transmits service data in the data domain and transmits midamble allocated by the system in the midamble domain of the uplink slot so that the base station may perform the channel estimation and synchronous control. The TD-SCDMA system allocates one basic midamble for each cell and different cells use different basic midambles, which are orthogonal to some extent. Midambles used by different users in the same cell are obtained by cyclically shifting the basic midamble for the cell and cyclical shifts for different users are different. Therefore, the base station may estimate the channel impulse responses of all the users in the cell once according to the basic midamble for the cell and by distinguishing midambles transmitted by users of the cell and the neighboring cells with correlation computations. Since midambles used by different users in the same cell have different cyclical shifts, the channel impulse responses of different users in the same cell may have different delays, i.e. channel impulse responses of different users in the same cell will be in different channel estimation windows. The position of the channel estimation window of each user may be determined by the cyclical shift of the midamble used by the user.

After the position of the channel estimation window of each user is determined, the base station may intercept the channel impulse response of each user from those of all the users in the cell and perform the multi-user joint-detection according to the channel impulse response of each user.

The above multi-user joint-detection process shows currently the base station can only perform the multi-user joint-detection on uplink signals of all the users in the cell and regard uplink signals of users in neighboring cells as unknown multiple access interference. Therefore, the above multi-user joint-detection method can only suppress the multiple access interference between users in the cell and cannot eliminate the multiple access interference from neighboring cells.

The influence of the multiple access interference from neighboring cell users on the system performance in the case of co-frequency networking will be illustrated with reference to FIG. 2. In the three cells shown in FIG. 2, all the users use the same frequency and slot resources. As shown in FIG. 2, when a user equipment (UE) 21 of cell 2 moves from cell 2 to cell 1, in order to guarantee the communication quality, UE21 will gradually increase its transmitting power under the uplink power control so that Node B1 of cell 1 receives stronger and stronger uplink signal power of UE21. For all the users in cell 1, uplink signals transmitted by UE21 will create stronger and stronger multiple access interference. In order to suppress the interference from the uplink signals of UE21, users in cell 1 will increase their transmitting power under the uplink power control so as to guarantee the communication quality. Thus, uplink signals of users in cell 1 will create greater multiple access interference for neighboring cells such as cell 2 and cell 3. Therefore, users in cell 2 and cell 3 such as UE32 will further increase its transmitting power. In this way, a positive feedback is formed and the average interference level of the whole network continues to increase. Since the transmitting power of a user is limited, the system capacity and coverage will be reduced finally.

According to the principle of the multi-user joint-detection technology, if Node B can obtain resources such as scrambling code, code channel, basic midamble and channel impulse response used by users of co-frequency neighboring cells which create the multiple access interference for the present cell, Node B may perform a unified multi-user joint-detection on received uplink signals of neighboring cells and of the present cell so as to effectively reduce the multiple access interference on users of the present cell from neighboring cells, further increase the uplink anti-interference ability of users of the present cell and increase the system capacity and coverage.

Node B may obtain information such as scrambling code, code channel and basic midamble used by neighboring cells from configuration information of the system. Therefore, one of the key problems is to obtain accurate channel impulse responses of users of neighboring cells so that uplink users of the neighboring cells may participate in the multi-user joint-detection. However, in the TD-SCDMA system, each user keeps synchronous with its cell, not necessarily with neighboring cells so Node B may easily locate positions of channel estimation windows of all the users in the cell and further obtain channel impulse responses of all the users in the cell but it cannot accurately locate positions of channel estimation windows of users in neighboring cells and therefore cannot obtain reliable uplink channel impulse responses of users in neighboring cells. If wrong channel impulse responses are used in the multi-user joint-detection process, greater interference will be created for users in the cell.

SUMMARY OF THE INVENTION

In order to solve the above problems, the present invention provides a method for determining user channel impulse response in the TD-SCDMA system so that Node B can accurately obtain channel impulse responses of users of neighboring cells.

The method for determining user channel impulse response in the TD-SCDMA system includes the following steps:

A. setting one or more than one synchronous ID code and establishing corresponding relations between channel estimation parameters of each user and the synchronous ID code and a sub-frame number of a sub-frame transmitting the synchronous ID code;

B. transmitting, by each user, a corresponding synchronous ID code in a sub-frame identified by a sub-frame number corresponding to channel estimation parameters according to the relations established in step A, wherein timing advance of transmitting the synchronous ID code is the same with that of transmitting uplink service data of the user;

C. at Node B, continuing to detect whether there is the synchronous ID code in received signals, if there is one or more than one synchronous ID code, determining the channel estimation parameters of the user transmitting the synchronous ID code according to the detected synchronous ID code, sub-frame number of the current sub-frame and the corresponding relations established in step A; and D. at Node B, computing the channel impulse response of the user according to the determined channel estimation parameters and arriving time of the detected synchronous ID code.

The establishment of corresponding relations between the channel estimation parameters of each user and the synchronous ID code and the sub-frame number of the sub-frame transmitting the synchronous ID code includes:

A1. dividing users using the same frequency and communicating in the same sub-frame in the system into one or more than one part according to the set synchronous ID code, wherein users of each part correspond to one synchronous ID code;

A2. allocating a sub-frame number of a sub-frame transmitting the corresponding synchronous ID code for each user of each part respectively.

The dividing in step A1 is carried out according to different cells or according to different slots or according to cyclical shifts of different midambles.

In step B, each user transmits the synchronous ID code in an uplink pilot slot of the sub-frame.

In step C, Node B detects whether there is the synchronous ID code in the received signals by performing a correlation computation on the received signals with the set synchronous ID code respectively and if a result of the computation exceeds a detection threshold, then the synchronous ID code is detected.

The channel estimation parameters of the present invention include a basic midamble used by the cell of the user, a slot number of a slot in which the user transmits uplink service data and a cyclical shift of the midamble used by the user.

The computing of the channel impulse response of the user in step D includes the steps of:

D1. determining arriving time of the uplink service data transmitted by the user according to the detected arriving time of the synchronous ID code;

D2. extracting the received midamble from the received signals according to the arriving time of the uplink service data transmitted by the user;

D3. performing a correlation computation on the extracted midamble with the basic midamble of the cell of the user to obtain a sequence including the channel impulse response of the user;

D4. determining a position of the channel estimation window of the user according the cyclical shift of the midamble used by the user corresponding to the basic midamble of the cell;

D5. intercepting the channel impulse response of the user from the sequence including the channel impulse response of the user according to the determined position of the channel estimation window.

The synchronous ID code is any pseudo random sequence which is orthogonal to some extent with the uplink pilot code used by the user when performing random access.

The above shows according to the method of the present invention, Node B can accurately obtain the position of the user's uplink service slot by setting the synchronous ID code, and setting the timing advance of transmitting the synchronous ID code the same with that of transmitting uplink service data of the user; Node B can directly obtain the channel estimation parameters of the user transmitting the synchronous ID code after it receives the synchronous ID code by establishing the corresponding relations between the synchronous ID code transmitted by the user, the sub-frame number of the sub-frame transmitting the synchronous ID code and the user channel estimation parameters and further accurately computes the channel impulse response of the user according to the arriving time of the uplink service data transmitted by the user.

According to the method of the present invention, Node B in the TD-SCDMA system can compute the channel impulse responses of the users in other co-frequency cells and can apply the computed channel impulse responses to the multi-user joint-detection process so as to improve the anti-interference ability of the TD-SCDMA system and to improve the system capacity and coverage.

DETAILED DESCRIPTION OF THE INVENTION

Figure 1:
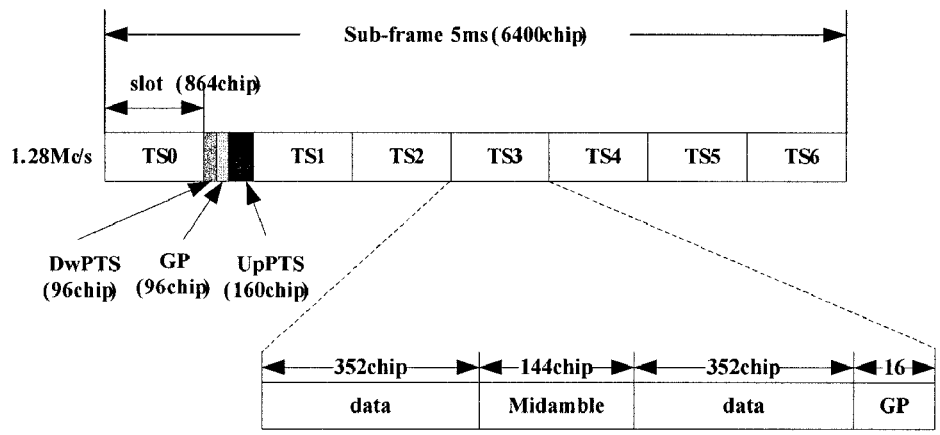
FIG. 1 is a schematic diagram showing the sub-frame structure of the TD-SCDMA system.
Figure 2:
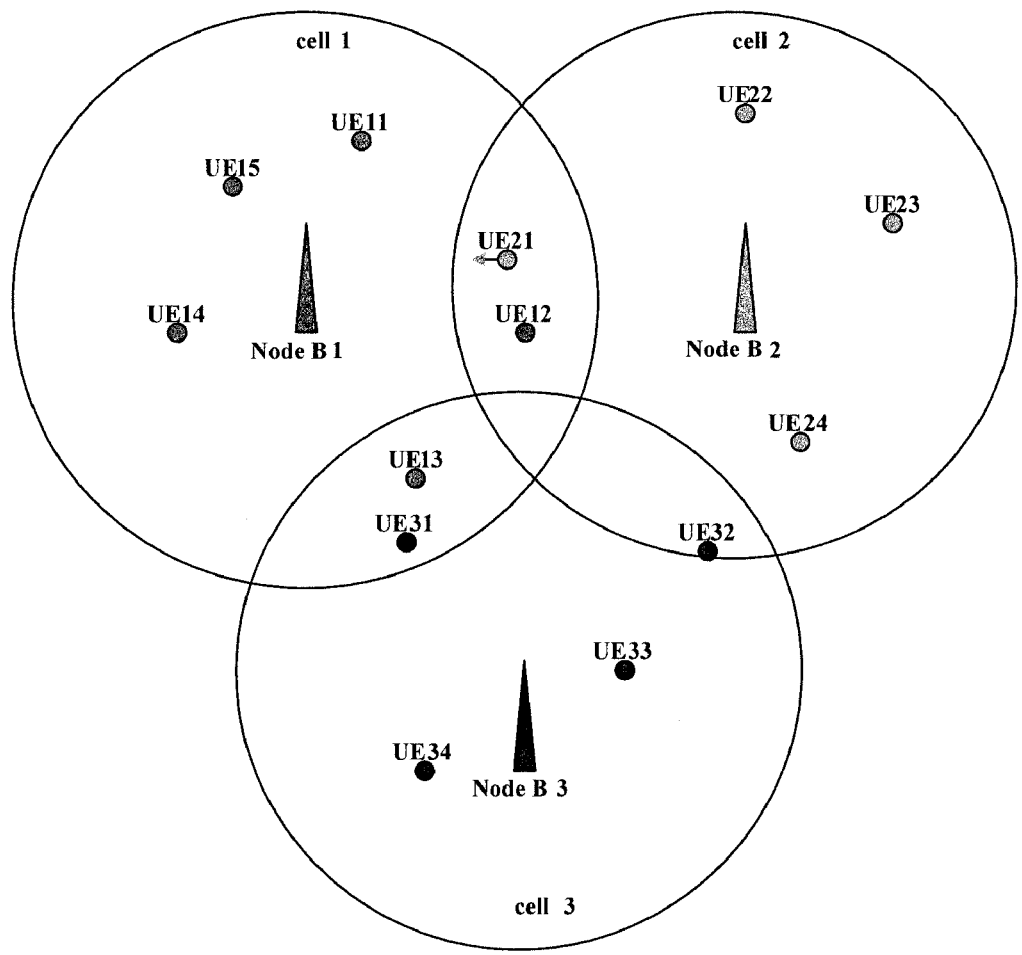
FIG. 2 shows in a case of co-frequency networking, an influence of multiple access interferences of neighboring cells on the system performance.

In order to make the objective, solution and advantage of the present invention more apparent, a detailed description will be given with reference to embodiments and accompanied drawings.

In the TD-SCDMA system, the channel impulse response of each user may be determined according to the following parameters: the basic midamble of the cell of the user, the slot transmitting uplink service data of the user, the arriving time of uplink service data of the user in the uplink service slot and the cyclical shift of the midamble used by the user corresponding to the basic midamble of the cell.

After obtaining the above parameters, Node B may compute the channel impulse response of the user according to these parameters. Specially, the computation process includes the steps of:

A. determining the arriving time of the uplink service data transmitted by the user in the uplink service slot and extracting the received midamble in the slot from the received signals according to the arriving time;

B. performing a correlation computation on the extracted midamble with the basic midamble of the cell of the user to obtain a sequence including the channel impulse response of the user;

C. determining a position of the channel estimation window of the user according the cyclical shift of the midamble used by the user corresponding to the basic midamble of the cell;

D. extracting the channel impulse response of the user from the sequence including the channel impulse response of the user determined in step B according to the determined position of the channel estimation window.

Those skilled in the art may understand that in order to achieve the above operation, the arriving time of the uplink service data of the user must be obtained. As discussed above, since the TD-SCDMA system uses the uplink synchronous technology, i.e. uplink signals of all the users at the same slot in the same cell arrive the receiver of Node B at the same time, Node B can obtain the arriving time of uplink signals of all the users in the cell but cannot obtain that of users in other co-frequency cells.

According to the method of the present invention, one or more special code word is defined which is transmitted by the user in the UpPTS and for indicating the arriving time of the service data in the uplink service slot transmitted by the user. These special code words are any pseudo random sequences which are orthogonal to some extent with the uplink pilot code used by the user when performing random access. In order to distinguish them from the uplink pilot code used by the user when performing random access, these special code words are called synchronous ID codes here.

In order to identify the arriving time of service data transmitted in the uplink service slot by the user, according to the method of the present invention, it is required that the timing advance of transmitting the synchronous ID code in the UpPTS is the same with that of transmitting uplink service data of the user in the uplink service slot so that Node B can detect the arriving time of the synchronous ID code by the correlation computation and then directly obtain the arriving time of the uplink service data transmitted in the uplink service slot by the user according to the detected arriving time of the synchronous ID code so that further determine the channel impulse response of the user according to the method in step A to step D.

Because of the limit of UpPTS itself, the number of the synchronous ID codes that can be defined by the method of the present invention is very limited, so it is difficult to allocate different synchronous ID codes for each user communicating in the same sub-frame and using the same frequency in the whole TD-SCDMA system. Therefore, each user communicating in the same sub-frame and using the same frequency in the whole TD-SCDMA system shares the synchronous ID codes.

In one preferred embodiment of the present invention, only one synchronous ID code is defined in the TD-SCDMA system and in this system, each user communicating in the same sub-frame and using the same frequency shares this synchronous ID code, i.e. only one user in the whole TD-SCDMA system transmits the synchronous ID code in the UpPTS. In order to achieve the above time division multiplexing, it should be specified in the UpPTS of which sub-frame each user communicating in the same sub-frame and using the same frequency should transmit the synchronous ID code. In this way, Node B may determine the synchronous ID code is transmitted by which user when detecting the synchronous ID code and then compute the channel impulse response of the user.

In the TD-SCDMA system, users communicating in the same sub-frame and using the same frequency can be identified according to the basic midamble used by the co-frequency cell of the system, the slots for transmitting the uplink service data by the users and the cyclical shifts of the midambles used by the users.

Supposing in a TD-SCDMA system, the largest number of basic midambles can be used by co-frequency cells is M ($M \geq 7$), the largest number of uplink slots can be used in one sub-frame is N ($1 \leq N \leq 6$) and the largest number of midambles obtained by cyclically shifting each basic midamble in each slot is K ($1 \leq K \leq 16$), then there are at most M×N×K users communicating in the same sub-frame and using the same frequency. These M×N×K users can be identified according to the channel estimation parameters.

According to the present embodiment, the corresponding relations between the sub-frame number of the synchronous ID code transmitted by each user and the channel estimation parameter of the user are shown in Table 1.

TABLE 1

| Basic midamble No. | Slot No. | Midamble cyclical shift No. | sub-frame No. corresponding to synchronous ID code |
|---|---|---|---|
| 0 | 0 | 0 | 0, M × N × K, ... |
| | | 1 | 1, M × N × K + 1, ... |
| | | ... | ... |
| | | K − 1 | K − 1, M × N × K + K − 1, ... |
| | ... | ... | ... |
| | N − 1 | 0 | (N − 1) × K, M × N × K + (N − 1) × K, ... |
| | | 1 | (N − 1) × K + 1, M × N × K + (N − 1) × K + 1, ... |
| | | ... | ... |
| | | K − 1 | N × K − 1, M × N × K + (N × K − 1), ... |
| ... | ... | ... | ... |
| m | n | k | (m + 1) × n × K + k, M × N × K + ((m + 1) × n × K + k), ... |
| ... | ... | ... | ... |
| M − 1 | N − 1 | K − 1 | M × (N − 1) × K + K − 1, M × N × K + (M × (N − 1) × K + K − 1), ... |

In the above table, $0 \leq m \leq M-1$, $0 \leq n \leq N-1$ and $0 \leq k \leq K-1$. It should be noted the slot number refers to the slot number of the slot transmitting the uplink service data in the sub-frame, i.e. if the slot number is "0", the slot is not TS0 but the first uplink service slot for transmitting the uplink service data, and the rest may be deduced by analogy.

With the above configuration, Node B may obtain the channel estimation parameters used by the user transmitting the synchronous ID code according to the received sub-frame number corresponding to the synchronous ID code and can directly obtain the arriving time of the uplink service data transmitted in the uplink service slot by the user according to the received arriving time of the synchronous ID code so that further determine the channel impulse response of the user according to the method in step A to step D.

It should be explained that the corresponding relations between the channel estimation parameters and the sub-frame number of the sub-frame transmitting the synchronous ID code can be other than those shown in Table 1. As long as at most one user transmits the synchronous ID code in one sub-frame is guaranteed, the method according to the present embodiment can be implemented.

An example will be given in explaining the method according to the present embodiment with reference to the corresponding relations shown in Table 1.

In a cell corresponding to the basic midamble number of "m", a user using the midamble cyclical shift with the number of "k" and transmitting uplink service data in the uplink service slot with the number of "n" will transmit the synchronous ID code in the UpPTS of the sub-frames with the number of (m+1)×n×K+k, M×N×K+((m+1)×n×K+k), . . . and the timing advance of transmitting the synchronous ID code in the UpPTS is the same with that of transmitting uplink service data of the user in the uplink service slot with the number of "n".

Since Node B in the TD-SCDMA system continues to detect whether the synchronous ID code is received according to the correlation computation. Therefore, Node B near the cell corresponding to the basic midamble number of "m" will detect the synchronous ID code in the sub-frames with the number of (m+1)×n×K+k, M×N×K+((m+1)×n×K+k), . . . .

Then, Node B may obtain the channel estimation parameters of the user transmitting the synchronous ID code according to the corresponding relations shown in Table 1 and the sub-frame number, i.e. may determine the basic midamble number of the cell where the user transmitting the synchronous ID code is "m", the user transmits the uplink service data in the uplink service slot with the number of "n" and the user uses the midamble cyclical shift with the number of "k". At the same time, the arriving time of the uplink service data transmitted in the uplink service slot by the user can be directly obtained according to the detected arriving time of the synchronous ID code.

When Node B determines determine the basic midamble number of the cell where the user transmitting the synchronous ID code, the slot used by the user to transmit data, the midamble used by the user and the arriving time of the uplink service data transmitted in the uplink service slot, Node B can determine the channel impulse response of the user according to the method in step A to step D. Specially, the determination process includes the steps of:

Firstly, extracting the received midamble from the signals received in this slot according to the determined arriving time of the uplink service data transmitted in the uplink service slot by the user;

Then performing the correlation computation on the extracted midamble by use of the basic midamble of the cell of the user to obtain the sequence including the channel impulse response of the user;

Finally, determining the position of the channel estimation window of the user according the cyclical shift of the midamble used by the user and extracting the channel impulse response of the user from the sequence including the channel impulse response of the user according to the position of the determined channel estimation window.

In another preferred embodiment of the present invention, more than one synchronous ID code is defined in the TD-SCDMA system and it is guaranteed that different synchronous ID codes are orthogonal. In the embodiment, users using the same frequency and communicating in the same sub-frame multiplex the synchronous ID codes by firstly code division multiplexing and then time division multiplexing. Therefore, the system should establish in advance the corresponding relations between the synchronous ID codes used by the users and the sub-frame numbers of the sub-frames transmitting the synchronous ID codes and the channel estimation parameters of the users.

The establishment of the corresponding relations specifically includes: firstly users using the same frequency and communicating in the same sub-frame in the TD-SCDMA system are divided into several parts according to the number of the synchronous ID codes defined in the system, wherein users of each part correspond to one synchronous ID code; the corresponding relations between the channel estimation parameters and the sub-frame numbers of the sub-frames transmitting the synchronous ID code for users in each part are established according to the method of the former preferred embodiment, i.e. the sub-frame number of the sub-frame transmitting the corresponding synchronous ID code for each user of each part is allocated respectively so that in one sub-frame only one user in each divided part transmits the corresponding synchronous ID code. Since different synchronous ID codes are orthogonal, users in different parts can transmit different synchronous ID codes at the same time. It should be stated that the above dividing of users is random, for example, the dividing can be carried out according to different cells or according to different slots or according to different cyclical shifts of the midamble.

After the above corresponding relations are established, Node B detects whether there is the synchronous ID code in received signals according to the correlation computation, and if there is one or more than one synchronous ID code, Node B will compute the channel impulse response of each user for each synchronous ID code according to the detected synchronous ID code, sub-frame number of the sub-frame and the established corresponding relations with the same method as in the former embodiment.

Figure 3:
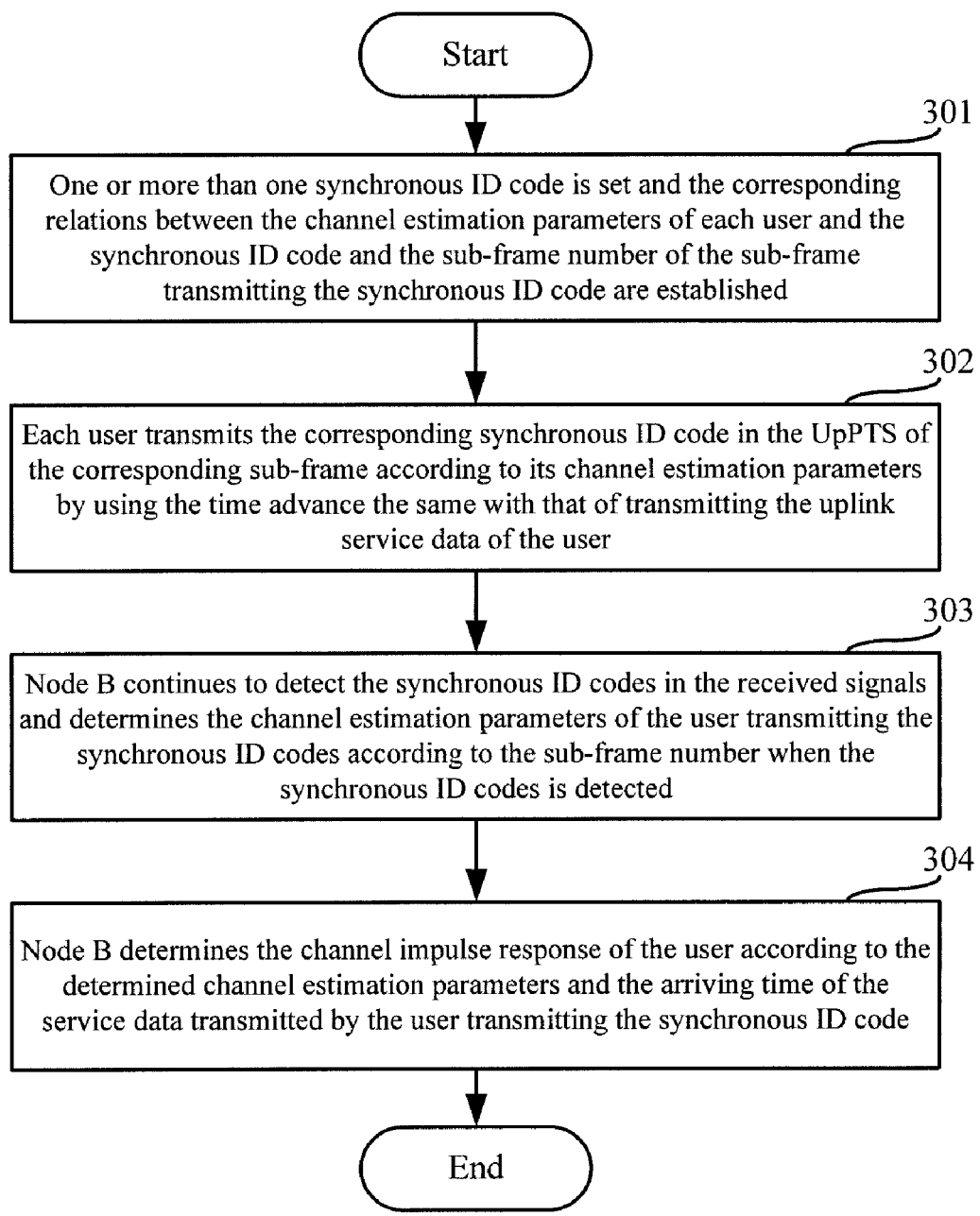
FIG. 3 is a flow chart of determining a channel impulse response in the TD-SCDMA system according to the present invention.

With reference to the above two embodiments and FIG. 3, it can be understood that the method of the present invention mainly includes the following steps:

In step 301, one or more than one synchronous ID code for indicating the arriving time of the uplink service data transmitted in the uplink service slot by the user is set and the corresponding relations between the channel estimation parameters of each user and the synchronous ID code and the sub-frame number of the sub-frame transmitting the synchronous ID code are established;

In step 302, each user transmits the corresponding synchronous ID code in the UpPTS of the corresponding sub-frame according to its channel estimation parameters and the corresponding relations established in step 301 by using the timing advance the same as that of transmitting the uplink service data of the user;

In step 303, Node B detects whether there is the synchronous ID code in the received signals by performing a correlation computation on the received signals with the set synchronous ID codes respectively and if a result of the computation exceeds a detection threshold, then the synchronous ID code is detected; after one or more synchronous ID code is detected, Node B obtains the channel estimation parameters of the user transmitting the synchronous ID code respectively according to the detected synchronous ID code, the sub-frame number and the corresponding relations established in step 301; and Node B directly obtain the arriving time of the uplink service data transmitted in the uplink service slot by the user according to the detected arriving time of the synchronous ID code;

The channel estimation parameters of the user includes the basic midamble used by the cell of the user, the slot number of the slot in which the user transmits uplink service data and the cyclical shift of the midamble used by the user;

In step 304, Node B uses the method in step A to step D to respectively determine the channel impulse response of the user transmitting the synchronous ID code according to the determined channel estimation parameters and the arriving time of the uplink service data transmitted in the uplink service slot by the user transmitting the synchronous ID code.

The above discussion shows according to the method of the present invention, Node B can accurately obtain channel impulse responses of users in other co-frequency cells.

The invention claimed is:

1. A method for determining user channel impulse response in the TD-SCDMA system, comprising steps of:
  A. setting one or more than one synchronous ID code and establishing corresponding relations between channel estimation parameters of each user and the synchronous ID code and a sub-frame number of a sub-frame transmitting the synchronous ID code;
  B. transmitting, by each user, a corresponding synchronous ID code in a sub-frame identified by a sub-frame number corresponding to channel estimation parameters according to the relations established in step A, wherein timing advance of transmitting the synchronous ID code is the same with that of transmitting uplink service data of the user;
  C. at Node B, continuing to detect whether there is the synchronous ID code in received signals, if there is one or more than one synchronous ID code, determining the channel estimation parameters of the user transmitting the synchronous ID code according to the detected synchronous ID code, sub-frame number of the current sub-frame and the corresponding relations established in step A, wherein Node B detects whether there is the synchronous ID code in the received signals by performing a correlation computation on the received signals with the set synchronous ID code respectively and if a result of the computation exceeds a detection threshold, then the synchronous ID code is detected; and
  D. at Node B, computing the channel impulse response of the user according to the determined channel estimation parameters and arriving time of the detected synchronous ID code, wherein the computing comprises the steps of:
  D1. determining arriving time of the uplink service data transmitted by the user according to the detected arriving time of the synchronous ID code;
  D2. extracting the received midamble from the received signals according to the arriving time of the uplink service data transmitted by the user;
  D3. performing a correlation computation on the extracted midamble with the basic midamble of the cell of the user to obtain a sequence including the channel impulse response of the user;
  D4. determining a position of the channel estimation window of the user according the cyclical shift of the midamble used by the user corresponding to the basic midamble of the cell; and
  D5. intercepting the channel impulse response of the user from the sequence including the channel impulse response of the user according to the determined position of the channel estimation window.

2. According to the method of claim 1, wherein the establishment of corresponding relations between the channel estimation parameters of each user and the synchronous ID code and the sub-frame number of the sub-frame transmitting the synchronous ID code comprises the steps of:
  A1. dividing users using the same frequency and communicating in the same sub-frame in the system into one or more than one part according to the set synchronous ID code, wherein users of each part correspond to one synchronous ID code; and
  A2. allocating a sub-frame number of a sub-frame transmitting the corresponding synchronous ID code for each user of each part respectively.

3. According to the method of claim 2, wherein the dividing in step A1 is carried out according to different cells or according to different slots or according to cyclical shifts of different midambles.

4. According to the method of claim 1, wherein in step B, each user transmits the synchronous ID code in an uplink pilot slot of the sub-frame.

5. According to the method of claim 1, wherein the channel estimation parameters comprise a basic midamble used by the cell of the user, a slot number of a slot in which the user transmits uplink service data and a cyclical shift of the midamble used by the user.

6. According to the method of any one from claims 1-4 and 5, wherein the synchronous ID code is any pseudo random sequence which is orthogonal to some extent with the uplink pilot code used by the user when performing random access.

* * * * *